A. BUBINGER.
FRICTION CLUTCH PULLEY.
APPLICATION FILED OCT. 22, 1914.
1,151,759.
Patented Aug. 31, 1915.
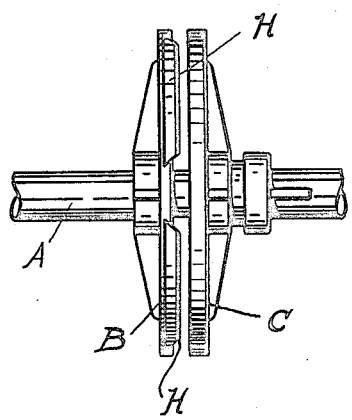
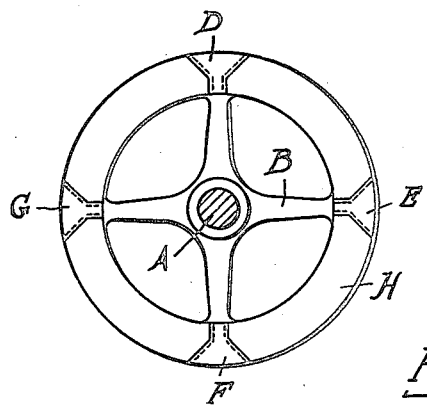
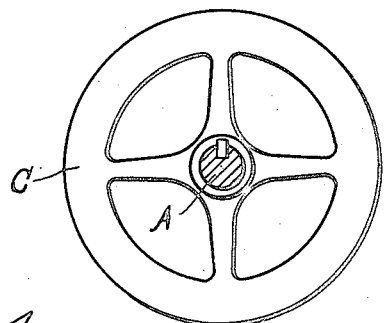
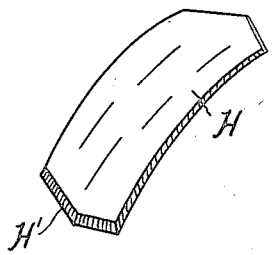
WITNESSES:
Edward A. Breed,
Blanche E. Chartier.
INVENTOR,
ALBERT BUBINGER,
BY Allen & Daggett,
ATTORNEYS.

UNITED STATES PATENT OFFICE.

ALBERT BUBINGER, OF CONCORD JUNCTION, MASSACHUSETTS.

FRICTION CLUTCH-PULLEY.

1,151,759.        Specification of Letters Patent.        Patented Aug. 31, 1915.

Application filed October 22, 1914. Serial No. 868,120.

*To all whom it may concern:*

Be it known that I, ALBERT BUBINGER, a citizen of the United States, and a resident of Concord Junction, in the county of Middlesex and State of Massachusetts, have invented a certain new and useful Improvement in Friction Clutch-Pulleys, of which the following is a specification, reference being had to the accompanying drawings.

The immediate object of this invention is to provide an extremely simple, cheap and effective form of friction clutch pulley for driving machinery in general, but more particularly for use with looms and the like machines, in which it is desirable to run the machine with a drive that will yield or slip under an excessive load, thus preventing breaks, and in which a quick stoppage of the machine is necessary whenever the "knock-off" or stop-motion is operated by the breaking of a filling thread.

My said invention is illustrated in the annexed drawings, Figure 1 being a view of a shaft having mounted thereon a friction clutch pulley embodying my present improvement. Fig. 2 is an inner face view of one pulley member, and Fig. 3 is a similar view of the companion member. Fig. 4 is a detached perspective view of one of the cork friction plates which form essential elementary features of my said pulley.

Referring to these drawings, the letter A indicates a shaft, B indicates one clutch member loosely mounted on said shaft and C denotes the companion clutch member, the latter named member being slidably splined on the shaft.

The loose member B is adapted to be driven by belt from any suitable source of power and, as here illustrated, its face which confronts the member C is formed with a plurality of bosses or raised portions, here shown as four in number and indicated by the reference letters D, E, F and G; the side walls of said raised portions being undercut and formed so as to present walls that are angular to the radii of the pulley B. Between the said bosses I insert plates or sheets H of cork, said sheets being beveled, as at H, to fit the undercut bosses, and also cut to fit the angular edges of said bosses; said cork sheets being somewhat thicker than the bosses as is best seen in Fig. 1 of the drawings.

When it is desired to place the cork sheets in position on the pulley B, the cork is bent in its mid portion in order to shorten the sheet so that its beveled end may be slipped under the undercut edges of the bosses and, when the cork returns to its normal flat position, it becomes locked in its operative position between the bosses.

When the sliding clutch member C is not in frictional engagement with the cork facing of the member B, the confronting faces of the member C and the cork are barely out of touch with each other, so that the cork cannot leave its flat form and become separated from the embrace of the undercut bosses in that direction, neither can it move laterally because of the angular form of its end supports. When, however, it becomes necessary or desirable to remove the cork sheets, it can be readily done by sliding the clutch member C farther away from member B and then springing the mid portion of the cork outward, thus withdrawing its ends from the undercut edges of the bosses.

My described clutch is of such simple construction that its component parts may be very cheaply produced, the two members B and C being of cast metal, with the undercut edges of the described bosses produced by coring. I am thus able to produce a clutch that is not only simple and cheap to construct but also one which is particularly effective.

Having thus described my invention I claim as new and wish to secure by Letters Patent:—

In a friction clutch pulley, in combination, two confronting disks, and means for moving said disks into engagement; one of said disks being provided with a plurality of undercut, angular bosses and with cork sheets interlocked with said bosses.

ALBERT BUBINGER.

Witnesses:
 FRANK H. ALLEN,
 MARION I. FERGUSON.